Oct. 26, 1926.
R. L. CARTER
1,604,679
GAUGE FOR SHAPING MACHINES
Filed May 7, 1926     2 Sheets-Sheet 1
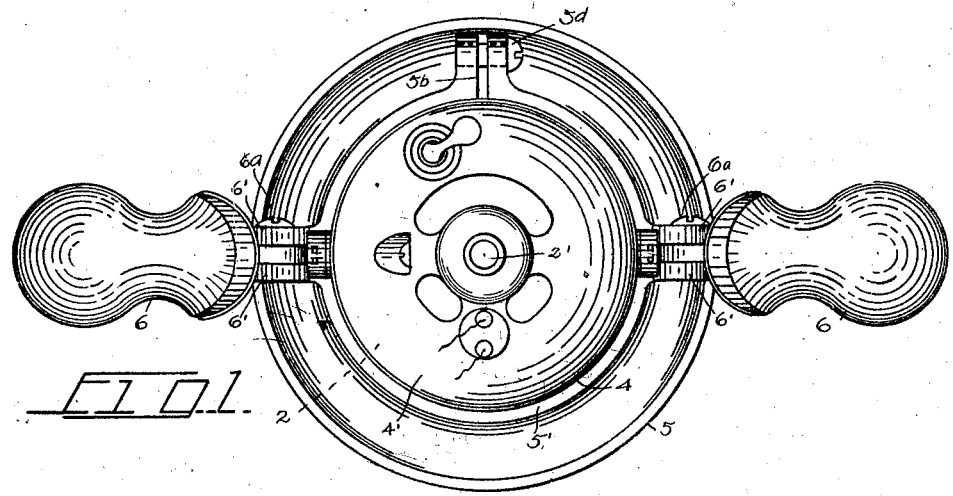
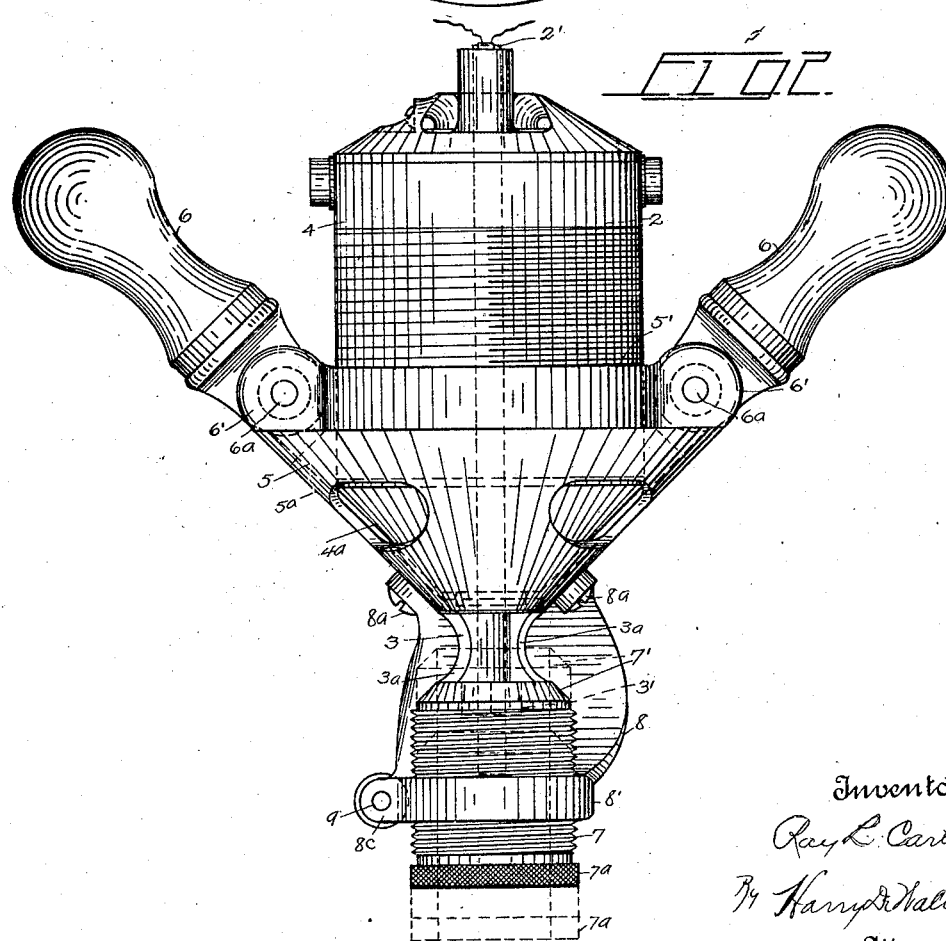
Inventor.
Ray L. Carter.
By Harry D. Wallace
Attorney.

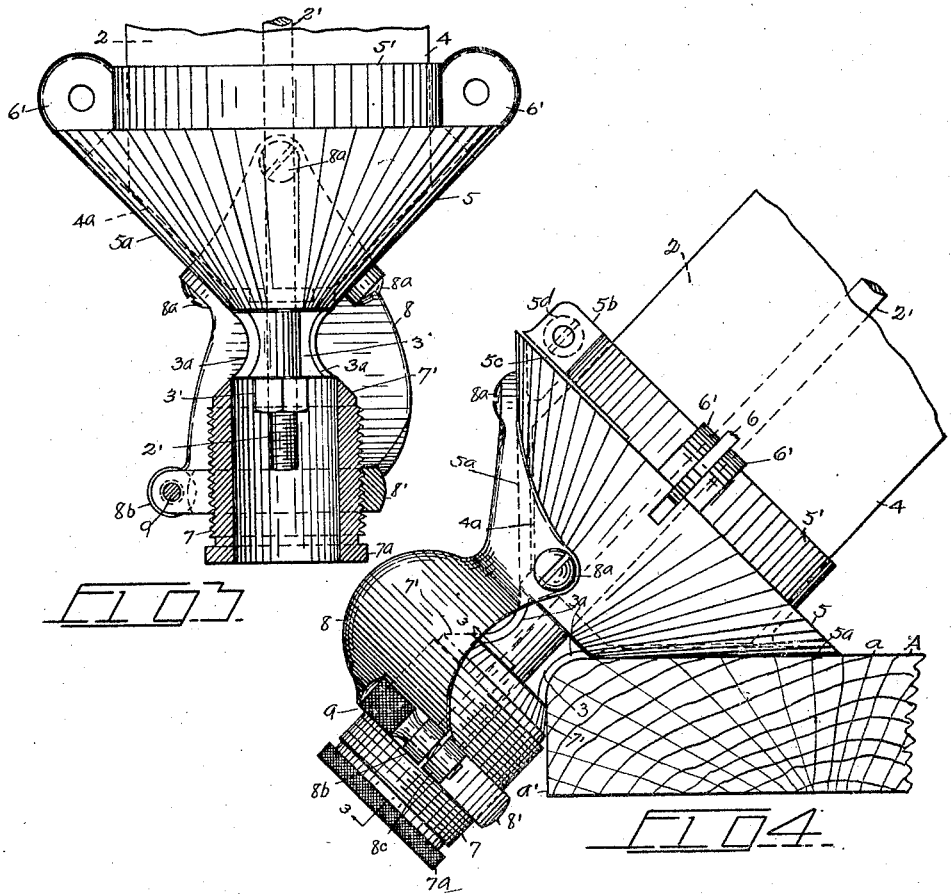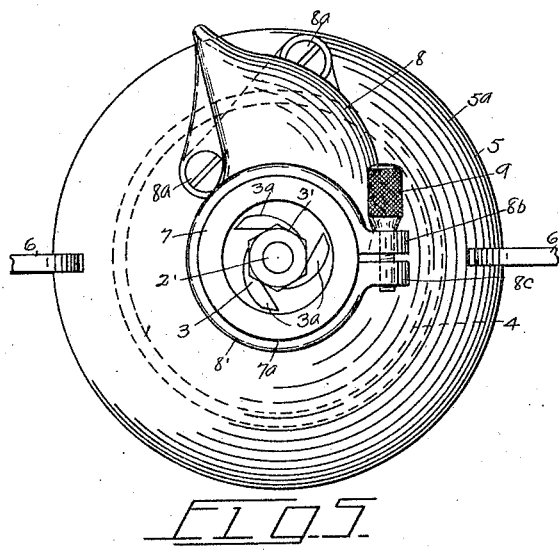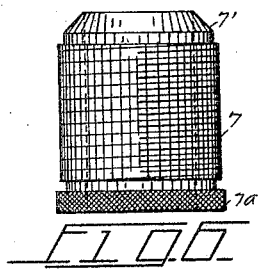

Patented Oct. 26, 1926.

1,604,679

UNITED STATES PATENT OFFICE.

RAY L. CARTER, OF PHOENIX, NEW YORK.

GAUGE FOR SHAPING MACHINES.

Application filed May 7, 1926. Serial No. 107,467.

This invention relates to improvements in electrically driven shapers, designed for shaping wood and metal work.

The present invention has especial reference to improvement of the devices shown and described in my United States Patent No. 1,433,497, dated October 24, 1922.

The object of the invention is to provide a machine of the class, for rounding, beading and ornamenting the corners of patterns and various other articles. A particular object is to provide a novel and simple guide comprising a tubular body, which cooperates with a part of the motor casing, for accurately positioning and guiding the machine and the shaping tool during the beading or shaping operations, the said guide being adjustable axially towards and away from the motor, for facilitating the use of tools of different length, as well as for varying the breadth and shape of the cuttings. A further object is to provide a novel support for the guide comprising a member which is mounted rigidly upon the motor casing, the said member having a split portion which embraces and holds the guide in line axially with the rotary tool. And a further object is to provide simple means for locking and holding the guide rigid and stationary in the various adjusted positions.

The various features and parts of the invention will be understood from the detailed description which follows, and by reference to the accompanying drawings, in which—

Figure 1 is a top plan view of the complete shaper. Fig. 2 is a side elevation; showing the guide supported by the dust guard, also showing the adjustable nature of the guide. Fig. 3 is a broken elevation and partial central vertical section, the section being taken on line 3—3 of Fig. 4. Fig. 4 is a view showing the shaper in the act of rounding the corner of a piece of wood. Fig. 5 is a bottom end view of the device, with certain parts omitted. And Fig. 6 is an elevational view of the guide.

In the drawings, 2 represents an electric motor, and 2' the armature shaft, which supports and drives the shaping tool 3, the latter being held rigid on the shaft by a nut 3'. The motor is usually encased in a cylindrical shell, as 4, the opposite ends of the shell being substantially closed, as by caps 4' and 4ª, the latter preferably being conical. A portion of the shell 4 is shown threaded externally, for rendering the motor adjustable axially in a detachable conical head or holder 5, the said head having an internally threaded hub 5' that receives the casing 4. The conical portion 5ª of the head preferably has a taper of 45°, and this portion usually rides upon and guides the machine over one plane surface of the work A, during the shaping operations, as best seen in Fig. 4. The hub 5' is preferably split, as at 5ᵇ, and is also slitted, as at 5ᶜ, for clamping the hub to the shell 4, by means of a screw 5ᵈ, for rendering the motor and head movable as one part, as well as for maintaining the adjustments of the motor and tool relatively to the head. The holder 5 is provided with similar handles 6, which are pivoted by means of split lugs 6', and screws 6ª, by which the machine is maneuvered over the work A. The shaft 2' preferably extends a considerable distance beyond the point of the cone 5ª, its lower end being threaded to receive the nut 3', and in order to properly support and steady the shaft and tool, and at the same time provide a suitable bearing against another edge or surface, as $a'$ of the work, preferably at right angles to the surface $a$, I provide a novel guide 7, which will now be described.

The guide 7 comprises a tubular body, whose top end is preferably formed with an annular 45° bevel 7', the said bevel being disposed substantially at right angles to the plane of the cone 5ª. The guide 7 is preferably bored out to a diameter that is slightly greater than the sweep of the cutter-blades 3ª of the tool, so that the guide may be freely moved axially over the tool without interference, as shown by the dotted lines in Fig. 2, and by the full lines in Figs. 3 and 5. The guide 7 is preferably externally threaded, and screws into and is solely supported by a split annular portion 8' of a chip-and-dust guard or member 8, which is rigidly mounted upon the cone 5ª by screws 8ª. The lower end of the guide 7 is preferably knurled for facilitating manual adjustment of said part, and the collar or ring 8' is formed with perforated lugs 8ᵇ—8ᶜ, (the latter being threaded) for receiving a screw 9, by which the collar may be rigidly clamped to the guide (see Figs. 2, 3, 4 and 5), for holding the guide in various adjusted positions.

In my former patent referred to, the guide 8 comprises a washer-like part, which is rigidly secured to the armature shaft by a nut 9, the same as the tool 6, and therefore rotates during the shaping work, and owing to the fact that the guide necessarily is in constant contact with a surface, as $a'$ of the work A, and is operated at extremely high speed, there is a constant wearing away of the guide, and at the same time the guide tends to chafe or otherwise wear and injure the work. In the present case, by providing the adjustable guide, which is arranged to be clamped and held rigid by the stationary guard 8, the machine may be moved over the work with only sufficient pressure to firmly hold and properly guide the tool, without danger of either wearing away the cone $7'$, or marring the work $a'$. Furthermore, the utilizing of the chip-and-dust guard for supporting the guide, not only eliminates extra parts, but the shaft $2'$, as well as the tool 3, rotate truly and evenly, and are not liable to chatter, flex, or wobble under any pressure exerted by the operator. This tends to produce a higher grade of shaping work, than is possible by the design and arrangement of the guide of the shaping device of my former patent, and besides cheapens and simplifies the construction of the machine.

Having thus described my invention, what I claim, is—

1. In a guide for shaping machines, the combination with a motor-driven tool and a dust guard supported by the motor, of a guide for holding the motor and tool at an angle to the work supported by said dust guard, means for adjusting the guide axially relatively to the tool, and means for holding the guide stationary during the shaping work.

2. The combination with an encased motor and a tool driven thereby, one end of the motor support being conical, of a guide disposed beyond the tool and movable axially towards and from the tool, means carried by the motor support for adjustably supporting said guide, and means for holding the guide stationary while the tool is performing its work.

3. In a guide for shaping machines, the combination with a motor and a tool driven thereby, and a dust guard supported by the motor, said guard having a threaded split portion alining with the axis of the tool, of a guide threaded for insertion and adjustment in the split portion of the guard, and means for clamping and holding the guide stationary while the shaping is being done.

4. The combination with an encased motor and a conical head for supporting the motor, and a tool disposed beyond said head and driven by the motor, of a member mounted rigidly on the head and having an annular threaded portion disposed beyond and in line axially with the tool, a threaded tubular guide adapted to be adjustably screwed into the annular portion of said member and aligning axially with the tool, the end of the guide facing the tool being formed conical and adapted to bear against a surface of the work at right angles to the surface engaged by the conical portion of the head, and means for holding the guide stationary while the shaping is being effected.

5. A shaping machine including a power driven tool, a fixed guide mounted near one end of the tool and supporting the tool, a movable guide mounted near the opposite end of the tool, the axes of said guides coinciding with the axis of the tool, means for adjusting the movable guide towards and from the fixed guide, and means for holding the movable guide rigid after the adjustments.

6. The combination with a shaping machine including a permanent conical guide and a tool operatively disposed beyond said guide, a second guide disposed beyond the tool adapted to be moved axially towards and away from the first guide and to telescope the tool, means for adjustably supporting the second guide, and means for holding the second guide rigid while the tool is performing its work.

7. The combination with a revolving tool and a support for said tool, of a pair of angular guides for controlling the movements of said tool over the work, the axes of said guides coinciding with the axis of said tool, one of said guides being normally rigid to the tool support, the other guide being movable towards and away from the tool, and means for holding the movable guide stationary while the tool is being rotated.

8. The combination with an enclosed motor and a tool driven thereby, one end of said motor casing being conical and adapted to engage a surface of the work, of a tubular guide having a beveled portion adapted to engage a surface of the work at right angles to the surface engaged by the conical portion of the casing, screw-threaded means carried by the casing for supporting said guide and for rendering said guide adjustably axially towards and away from the tool, and means for preventing movement of the guide during the operations of the tool.

9. A shaping device including a revoluble tool, a support for said tool, one end of said support formed with a conical guiding surface, means for adjusting the tool axially relatively to said guiding surface, a second guide disposed near the opposite end of the tool, means for moving the second guide in the line of the axis of the tool for varying the gap between said guides, and means for holding the second guide stationary while the tool is being operated.

10. The combination with an encased motor and a tool driven thereby, of a pair of angular members for guiding the motor and tool over a piece of work, said members being spaced to receive the tool therebetween and alining axially with the tool, one of said members being stationary, the other member being movable towards and away from the tool, and means for rendering the latter guide stationary during the intervals the tool is performing its work.

11. A machine including a motor and a shaft driven thereby, a pair of guides mounted concentrically and loosely relatively to said shaft and being spaced apart, a cutting-tool carried by said shaft and disposed between said guides, means for moving said guides axially towards and away from each other, and means for maintaining the adjustments of said guides for rendering them stationary while the tool is performing its work.

In testimony whereof I affix my signature.

RAY L. CARTER.